United States Patent [19]

Ueda

[11] Patent Number: 4,725,014
[45] Date of Patent: Feb. 16, 1988

[54] AUTOMATIC LOCKING RETRACTOR FOR A SEAT BELT ASSEMBLY

[75] Inventor: Hidefumi Ueda, Osaka, Japan

[73] Assignee: Ashimori Industry Company, Inc., Ltd., Osaka, Japan

[21] Appl. No.: 888,063

[22] Filed: Jul. 22, 1986

[30] Foreign Application Priority Data

Jul. 22, 1985 [JP] Japan ............................ 60-113350[U]

[51] Int. Cl.$^4$ ............................................. B65B 35/00
[52] U.S. Cl. ............................................. 242/107.4 D
[58] Field of Search ................ 242/107.4 D, 107.4 A; 280/803, 806, 807

[56] References Cited

U.S. PATENT DOCUMENTS

| | | |
|---|---|---|
| 715,424 | 12/1902 | Sawyer . |
| 3,138,405 | 6/1964 | Hanway . |
| 3,174,704 | 3/1965 | Replogle . |
| 3,348,789 | 10/1967 | Hirsch . |
| 3,412,952 | 11/1968 | Wohlert et al. ............. 242/107.4 D |
| 3,446,454 | 5/1969 | Kovacs et al. . |
| 3,450,368 | 6/1969 | Glauser et al. . |
| 3,471,100 | 10/1969 | Arcari . |
| 3,476,333 | 11/1969 | Weman . |
| 3,659,801 | 5/1972 | Romanzi ..................... 242/107.4 D |
| 3,667,698 | 6/1972 | Fisher . |
| 4,498,643 | 2/1985 | Ono ........................... 242/107.4 D |
| 4,570,873 | 2/1986 | Kurtti ...................... 242/107.4 D X |
| 4,585,186 | 4/1986 | Izuchi et al. ................ 242/107.4 D |

FOREIGN PATENT DOCUMENTS 60-11858 1/1985 Japan .
60-55565 4/1985 Japan .

Primary Examiner—Donald Watkins
Attorney, Agent, or Firm—Birch, Stewart, Kolasch & Birch

[57] ABSTRACT

An automatic locking retractor for a seat belt assembly, which comprises a housing having a shaft for webbing, a spring for urging the shaft in a predetermined direction to cause rewinding of the webbing, a rachet wheel integrally fixed to the shaft, a pawl for locking the rachet wheel in position, a diameter-sensing element capable of sensing the diameter of the webbing wound about the shaft, and a control member. The control member has a first leg on one end and a second leg on the other end and is fitted on the shaft to permit movement between a pair of stoppers and to permit frictional sliding when one of the stoppers is engaged and the shaft continues to rotate. The rachet wheel has teeth for engagement with the pawl and these teeth are arranged at an interval almost equal to the distance between the first and second leg of the control member. The first leg is positioned to be capable of assuredly engaging and guiding the pawl to one of the teeth of the rachet wheel to prevent rotation of the shaft in a direction to unwind the webbing.

3 Claims, 13 Drawing Figures

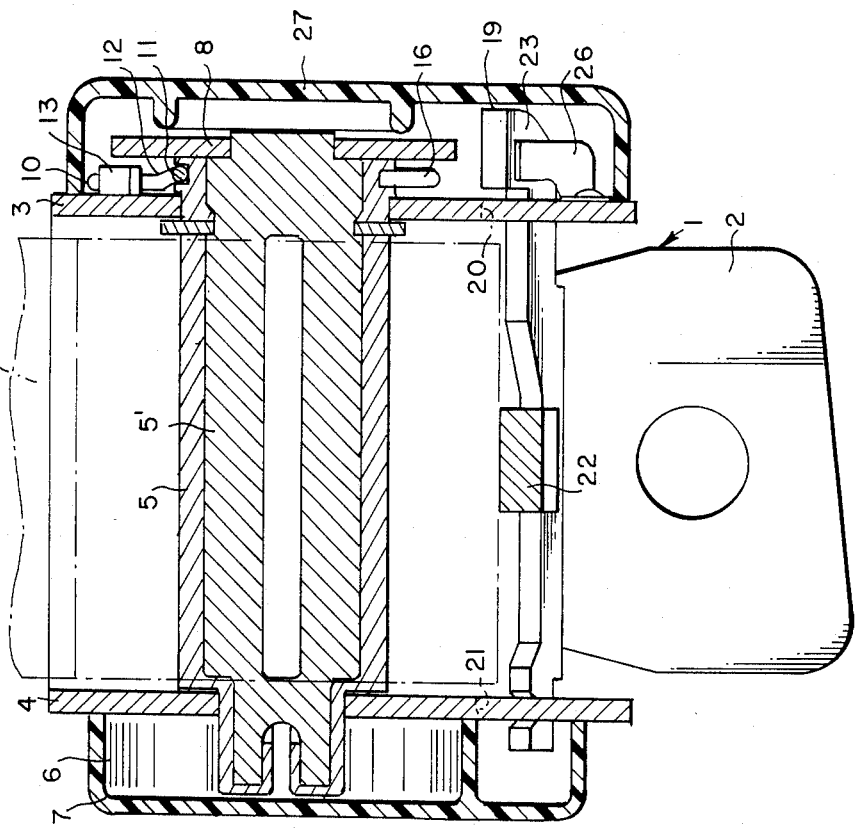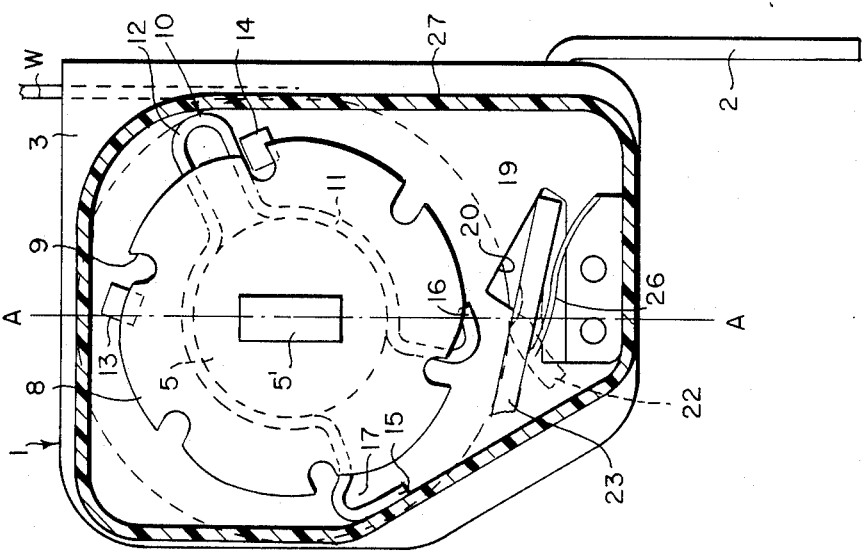

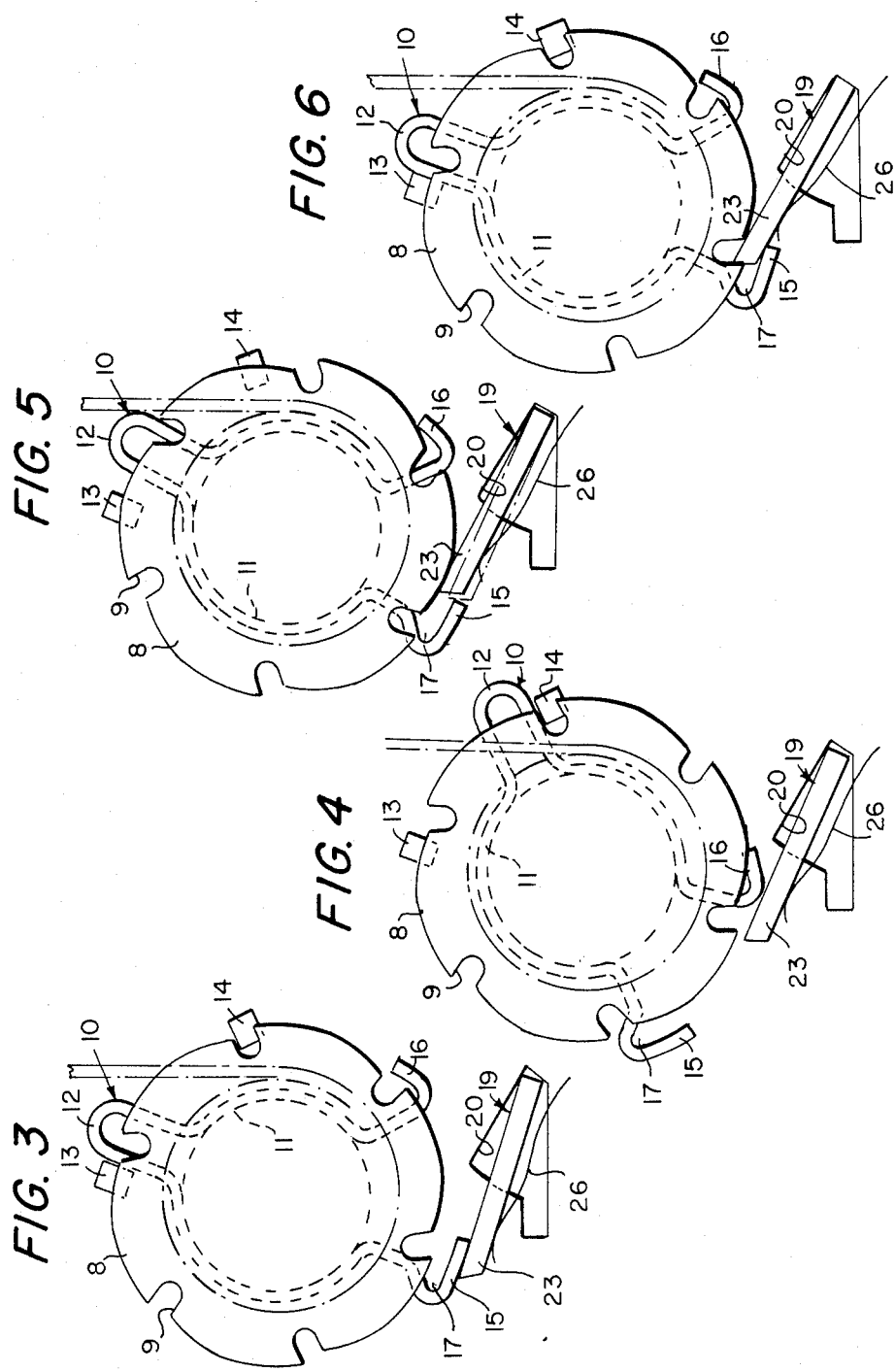

AUTOMATIC LOCKING RETRACTOR FOR A SEAT BELT ASSEMBLY

BACKGROUND OF THE INVENTION

1. Field of the Invention:

The present invention relates to an automatic locking retractor for a seat belt assembly used, for example, in motor-vehicles. More particularly, the present invention relates to an automatic locking retractor provided with an improved locking mechanism which makes it impossible to pull out a webbing beyond a certain length by first pulling out the webbing in excess and retracting it slightly for a buckling operation, thereby to secure seat occupants and to prevent injury or physiological damage caused by any traffic accident.

2. Description of the Prior Art:

In recent years, the majority of automobiles are provided with seat belts in accordance with safety regulations now enforced almost throughout the world for the purpose of protecting seat occupants against any unexpected traffic accident. In addition to buckle assemblies necessary for such seat belts, various kinds of retractors have been proposed for the seat belts. Among the retractors now put in practice, those of an automatically locking type, i.e. automatic locking retractors (ALR), are widely known. The retractors of this type now proposed have various structures but are constructed basically by a shaft for pulling out or rewinding a webbing, a lock mechanism for the shaft and a control means for the lock mechanism. Typical examples of the conventional automatic locking retractors are disclosed in Japanese Laid-open Utility Model Applns. Nos. Sho. 60-11858 and Sho. 60-55565 (U.S. Pat. No. 4,585,186). The automatic locking retractor for a seat belt disclosed in Japanese Laid-open Utility Model Appln. No. Sho. 60-11858 comprises, as shown in FIGS. 1–6, a takeup shaft 22A for a webbing 24, a rachet wheel 28 being rotatable coaxially with the takeup shaft, a pawl 30 capable of taking a locked position or an unlocked position to the rachet wheel 28, a diameter-sensing means 34 capable of sensing the diameter fo the roll of webbing wound on the takeup shaft to let the pawl take the locked position to the rachet wheel only in the case of the roll being smaller than a predetermined amount and a spring member (control member) having on both ends thereof a first leg and a second leg each extending from the outer periphery of the rachet, the spring member 36 being fitted on the shaft in such a manner that the member 50 is slidable with friction on the shaft and rotatable within a restricted range defined by a pair of pins 42 and 44 mounted to the rachet wheel 28.

In case the seat belt is not used, the webbing is kept fully wound on the rotatable takeup shaft whereby the pawl is located in an unlocked position to the rachet wheel by means of the diameter-sensing means. When the webbing is pulled out, the shaft is rotated in the direction of the webbing being pulled out and the spring member is incidentally rotated within a predetermined range in the same direction. In this state, the spring member holds the pawl in the unlocked position to the rachet wheel in such manner that the first leg positioned in rear of the second leg in the direction of the webbing being pulled out supports the pawl. As the pawl is not engaged with the rachet wheel, the shaft can freely be rotated to pull out the webbing over a necessary length for a buckling operation. When the webbing pulled out in excess length is retracted after the buckling operation, the takeup shaft is rotated in the opposite direction (in the direction of the webbing being rewound) and the spring member is also rotated incidentally whereby the pawl is supported by the second leg in place of the first leg and is consecutively located in the unlocked position to the rachet wheel. If the body of the seat belt wearer is moved forward by a sudden braking or traffic accident, the webbing will be pulled out of the retractor to permit rotation of the shaft in the direction of pulling out the webbing whereby the spring member will be incidentally rotated with the result that the pawl will be detached from the second leg and engaged with the rachet wheel to take a locked position thereto, thus inhibiting the webbing from further being pulled out. Consequently, the seat belt is not loosened and keeps the wearer fastened to the seat in case of a sudden braking or traffic accident. When the seat belt wearer operates the buckle to unfasten the seat belt, the webbing is fully rewound on the takeup shaft which is energized at all times to rotate in the rewinding direction by resiliency of a spring means, whereby the pawl is supported by the second leg to take the unlocked position to the rachet wheel.

The automatic locking retractor disclosed in Japanese Laid-open Utility Model Appln. No. Sho. 60-55565 (U.S. Pat. No. 4,585,186) is similar in structure to that disclosed in the aforementioned Japanese Laid-open Utility Model Appln. No. Sho. 60-11858 but some modifications are made especially in the spring member 36 so as to form a hairpin-like projection in the central part instead of the two legs on both ends. The spring member 36 is rotatable with the rachet wheel 28 within a restricted range defined by two pins 42 and 44 (FIGS. 2 and 3) or one pin 45 (FIGS. 4 and 5) mounted to the rachet wheel and controls the engagement of a pawl 30 with the rachet wheel 28. Thus, this automatic locking retractor is somewhat simplified in structure but achieves basically an equivalent effect.

These prior art automatic locking retractors are seemingly provided with a satisfactory automatic locking mechanism but still have some detrimental drawbacks to be overcome in practical use. In the automatic locking retractor disclosed in Japanese Laid-open Utility Model Appln. No. Sho. 60-11858, the second leg 38 holds the pawl 30 in the unlocked position to the rachet wheel 28 under normal belt-wearing conditions. If the webbing 24 is strongly pulledy out in such a state, the takeup shaft 22A and the rachet wheel 28 will be rotated rapidly in the direction of the webbing being pulled out to swing the pawl 30 whereby some time lag may take place for the engagement with the rachet wheel. During such time lag, the first leg 40 located in rear of the second leg 38 in the direction of the webbing being pulled out is interposed between the pawl 30 and the rachet wheel 28 to hold the pawl in the unlocked position to the rachet wheel whereby the webbing is freely pulled out. In case of a sudden braking or any traffic accident, the body of the belt-wearer is moved forward by inertia whereby the webbing is strongly pulled out. Thus, the automatic locking mechanism of this retractor does not function completely in case of any accident whereby the belt-wearer is exposed to an unexpected dangerous conditions.

Another drawback found in this retractor is the socalled "automatic body-squeezing phenomenon" generally observed in the prior art antomatic locking retractors. The rachet wheel 28 has a number of teeth on the periphery thereof for engagement with the pawl 30. On the other hand, the webbing is at all times pulled in the rewinding direction as the takeup shaft 22A is energized to rotate in the rewinding direction by a spring means. When the body of the belt-wearer is swung during driving of the motor-vehicle, the webbing is also swung and may sometimes be pulled out. In this case, the pawl is allowed to engage with the rachet wheel to prevent the webbing from being pulled out further. Since the rachet wheel 28 is at all times energized to rotate together with the takeup shaft 22A in the direction of the webbing being rewound and since the interval between the teeth (i.e. the distance to the adjacent tooth) on the periphery of the rachet wheel 28 is relatively short, the pawl located in a certain tooth of the rachet wheel tends to move to the adjacent tooth in accordance with the rewinding force acting on the webbing, while keeping the engagement with the rachet wheel, whenever the body of the belt-wearer is swung. If this tendency is strong, the body of the belt-wearer will gradually be squeezed tightly, causing an unpleasant feeling for the belt-wearer.

In the automatic locking retractor disclosed in Japanese Laid-open Utility Model Appln. No. Sho. 60-55565 (U.S. Pat. No. 4,585,186), the first mentioned drawback as seen in the case of any traffic accident with respect to the retractor disclosed in Japanese Laid-open Utility Model Appln. No. Sho. 60-11858 is overcome to a certain degree, but the second mentioned drawback based on the "automatic body-squeezing phenomenon" is not overcome at all.

In addition to the above drawbacks, these prior art automatic locking retractors have a common problem in that an unpleasant click noise occurs when the webbing is rewound. This is due to the fact that the pawl is allowed to abut against a number of teeth formed on the periphery of the rachet wheel upon rewinding the webbing.

In view of the foregoing situations, further improvements are required in the prior art automatic locking retractors as disclosed in the aforesaid publications to overcome all the drawbacks mentioned above thereby achieving assured operation of the locking mechanism and removing unpleasant feeling during use. In the practical aspect, therefore, there is a great demand for developing a new type of automatic locking retractor for a seat belt assembly, which is improved in its automatic locking mechanism for assured operation and satisfactorily overcomes the drawbacks seen in the prior art similar retractors.

BRIEF SUMMARY OF THE INVENTION

Accordingly, it is an object of the present invention to provide an automatic locking retractor for a seat belt assembly, which is improved in its automatic locking mechanism to enable its assured operation.

It is another object of the present invention to provide an automatic locking retractor for a seat belt assembly, wherein all of the drawbacks seen in the prior art similar retractors are satisfactorily overcome.

It is still another object of the present invention to provide an automatic locking retractor for a seat belt assembly, which enables the pawl to remain engaged with the rachet wheel in order to hold the belt-wearer safely in his/her seat even in the event the seat belt is pulled out suddenly.

It is further object of the present invention to provide an automatic locking retractor for a seat belt assembly, which relieves the belt-wearer from unpleasant body-squeezing and avoids click noise.

Other and avoids further objects, features and advantages of the present invention will become apparent more fully from the following description. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

As a result of extensive research made by the present inventors on the automatic locking mechanism of the retractors of this type, it has now been found that the drawbacks seen in the prior art automatic locking retractors are all overcome by improving the mechanism in such manner that the first leg is extended outwardly beyond the periphery of the rachet wheel longer than the second leg and the front end of the first leg is bent to form a hook capable of guiding the pawl to the tooth on the rchet wheel and that the teeth of the rachet wheel are arranged at an interval almost equal to the distance between the first leg and the second leg.

In accordance with the present invention, there is provided an automatic locking retractor for a seat belt assembly, which comprises in a housing thereof a shaft for a webbing capable of pulling out and rewinding the webbing wound on the surface thereof and being rotatably journaled to the housing in such a manner that the shaft is energized at all times to rotate in the rewinding direction by resiliency of a spring, a rachet wheel being integrally fixed to the shaft, a pawl capable of taking a locked position or an unlocked position to the rachet wheel, a diameter-sensing means capable of sensing the diameter of a roll of the webbing wound on the shaft to let the pawl take the locked position to the rachet wheel only in the case of the roll being smaller than a predetermined amount, and a control member having at both ends thereof a first leg and a second leg each extending beyond the outer periphery of the rachet wheel, the control member being fitted on the shaft in such a manner that the member is slidable with friction on the shaft and rotatable coaxially with the rachet wheel within a restricted range defined by a pair of stoppers, characterized in that the rachet wheel has teeth for engagement with the pawl on the periphery thereof which are arranged at an interval almost equal to the distance between the first leg and the second leg and that the first leg positioned in rear of the second leg in the direction of pulling out the webbing extends outwardly beyond the rachet wheel longer than the second leg and the end of the first leg is bent to form a hook capable of guiding the pawl to the tooth on the rachet wheel.

The present invention can more fully be understood from the following description taken in conjunction with the accompanying drawings which are given by way of illustration only, and thus are not limitative of the present invention, and in which:

FIG. 1 is a side cross-sectional view of a typical example of the automatic locking retractor of the present invention;

FIG. 2 is a cross-sectional view of the automatic locking retractor taken along the line A—A in FIG. 1;

FIGS. 3–6 are a series of side sectional views of the automatic locking retractor of the present invention showing the operation, especially the actuation of the pawl and the rachet wheel in order.

Figure 7:
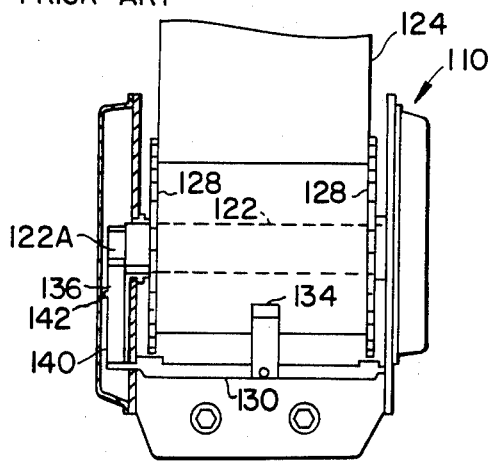
Figure 8:
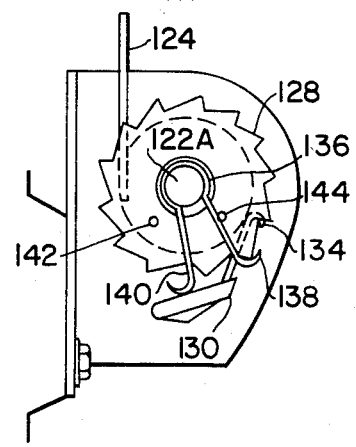
Figure 9:
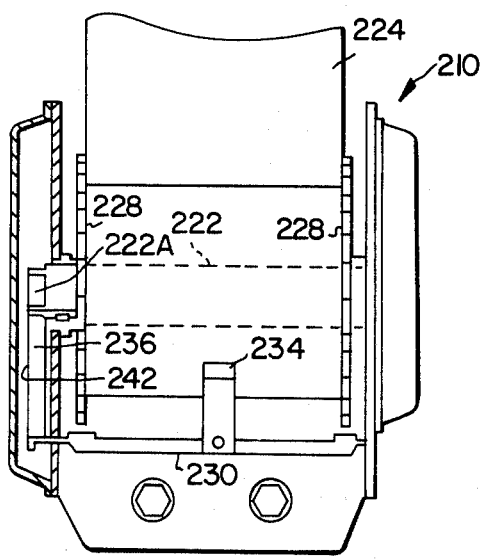
Figure 10:
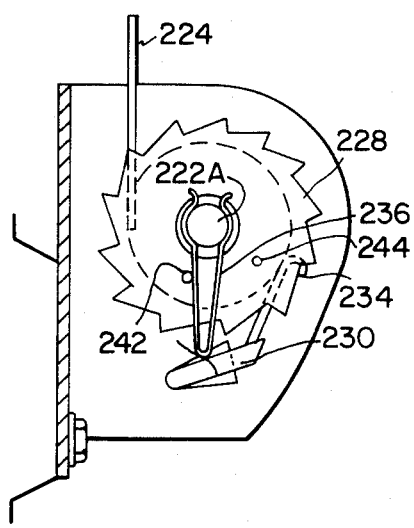
Figure 11:
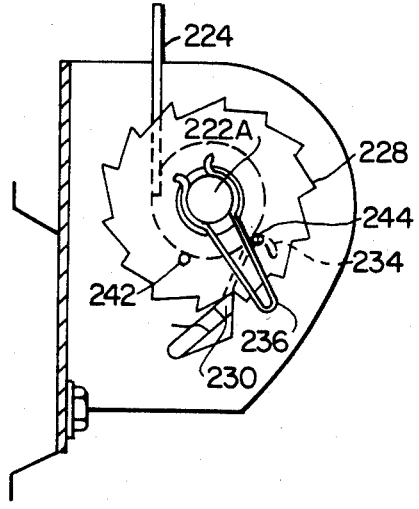
Figure 12:
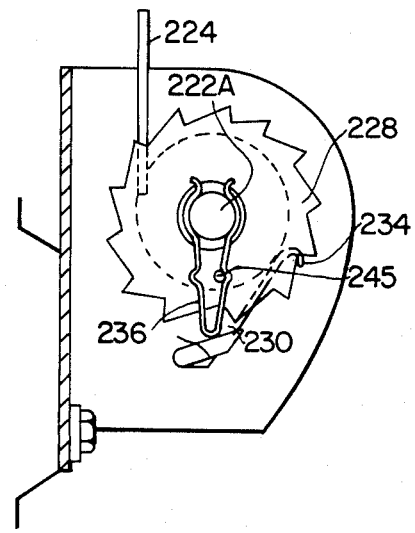
Figure 13:
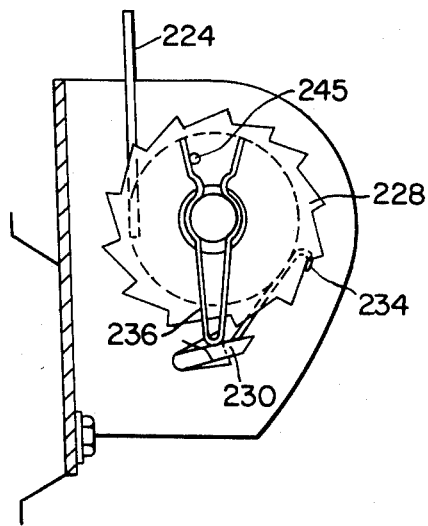

Referring to FIGS. 1 and 2, the body of the automatic locking retractor comprises a housing 1, a bottom plate 2, a pair of side plates 3 and 4 disposed vertically on opposite edges of the bottom plate 2, a shaft 5 capable of pulling out and rewinding a webbing W wound on the surface thereof as a roll and being rotatably journaled at both ends thereof to the side plates 3 and 4, a spring means 6 mounted on the side plate 4 for energizing the shaft 5 to rotate in the direction of rewinding the webbing W (in counterclockwise direction in FIG. 1) and a cover 7 for the spring means 6 being attached to the side plate 4. For the purpose of saving cost and reducing weight of the retractor, the shaft 5 may be made fo a synthetic resin instead of metal. In this case, a spindle 5' forming a core should preferably be made of metal for reinforcing the resinous shaft 5.

One end (the end rotatably journaled to the side plate 3) of the shaft 5 is integrally fixed to a rachet wheel 8 having teeth 9 on the periphery thereof. The rachet wheel 8 is coaxially rotatable together with the shaft 5. On the shaft 5 a control member 10 is fitted which is capable of sliding on the shaft 5 by a frictional force acting between the control member 10 and the shaft 5. The control member 10 is basically made of a metal wire and is fitted on the shaft 5 at a groove 11 formed thereon and located in a position between the side plate 3 and the rachet wheel 8. The control member 10 in the form of a metal wire having a hairpin-like projection (a projection in an upside-down U- or V-shape) 12 in the central portion thereof. The rotation of the control member 10 is restricted to a range defined by a pair of stoppers 13 and 14 each mounted to the side plate 3 in such manner that the rotation of the control member 10 around the shaft 5 in counterclockwise direction in FIG. 1 is stopped by the projection 12 abutting against the stopper 13 and the rotation in clockwise direction in FIG. 1 is stopped by the projection 12 abutting against the stopper 14. Thus, the control member 10 is reciprocally movable within the range defined by a pair of the stoppers 13 and 14.

The metal wire forming the control member 10 is bent at its both ends to form a first leg 15 and second leg 16 each extending outwardly beyond the periphery of the rachet wheel 8. The first leg 15 and the second leg 16 are bent in the direction of the webbing W being pulled out (in counterclockwise direction in FIG. 1) in such a fashion that the first leg 15 is extended outwardly in the radial direction longer than the second leg 16 and the front end of the first leg 15 forms a curved hook 17 in a toppled U-shape while the tip of the second leg 16 forms a hook simply in L-shape.

A hook plate 19 is supported at both ends thereof on fan-shaped supporting holes 20 and 21 formed respectively in the side plates 3 and 4 so that the hook plate 19 may swing freely within the space defined by the fan-shaped supporting holes. A central part of the hook plate 19 is provided with a diameter-sensing means 22 capable of sensing the diamter of a roll of the webbing W wound on the shaft 5. An edge of the hook plate 19 extending from the side plate 3 forms a pawl 23 capable of taking a locked position or on unlocked position to the teeth 9 formed on the periphery of the rachet wheel 8. The hook plate 29 is at all times biased to a roll of the webbing W by a spring means 26 so that the diameter-sensing means 22 may at all times be allowed to contact with the roll to sense the diameter thereof. All of the locking mechanism extending from the side plate 3 is protected by a cover 27.

For better understanding of the operation of the automatic locking retractor of the present invention, a detailed explanation will be given hereinafter with respect to the individual stages of the locking process with reference to the illustrations shown in the drawings.

In FIGS. 1 and 2, the automatic locking retractor is at the initial or original stage where the retractor is not yet used. At this stage, the webbing W is entirely wound on the shaft 5. When the webbing is rewound on the shaft 5 of the retractor, the shaft 5 is rotated in clockwise direction in FIG. 1 whereby the control member 10 is also rotated in a clockwise direction by the frictional force occurring in the groove 11 between the control member 10 and the shaft 5 and stopped when the projection 12 of the control member 10 abuts against the stopper 14. The shape of the projection 12 is usually a hairpin-like upside-down U-shape but may be an upside-down V-shape. The stoppers 13 and 14 are usually in the form of a pole standing on the side plate 3, which may be circular, polygonal or square in cross section. As the webbing W is fully wound on the shaft 5 as a big roll having a larger diameter, the diameter-sensing means 22 of the hook plate 19 is swung in counterclockwise direction in FIG. 1, resisting to the resiliency of the spring means 26, whereby the pawl 23 is held in the unclocked position to the rachet wheel 8. In this state, the shaft 5 can be rotated in either direction.

FIG. 3 is an explanatory side sectional view of the automatic locking retractor of this invention showing the first stage in the process of the operation, i.e. the state in which the webbing W is pulled out for wearing the seat belt. When the webbing W is pulled out, the shaft 5 is rotated in the direction of the webbing being pulled out (in counterclockwise direction in FIG. 3) while winding up the spring means 6. Incidentally, the control member 10 is also rotated in the direction of the webbing W being pulled out by frictional force acting between the shaft 5 and the control member 10 whereby the first leg 15 in rear of the second leg 16 in the direction of the webbing being pulled out is located in a position between the pawl 23 and the outer periphery of the rachet wheel 8. The rotation of the control member 10 is stopped in this stte as the projection 12 abuts against the stopper 13, while the rotation of the shaft 5 still continues, keeping friction with the control member 10 in the groove 11, to permit pulling out of the webbing W over a necessary length.

Whenever the webbing W is pulled out, the diameter of a roll of the webbing wound on the shaft 5 is decreased. In this case, the hook plate 19 is swung in clockwise direction in FIG. 3 by the resiliency of the spring means 26 while letting the diameter-sensing means 22 measure the amount of the webbing pulled out, whereby the pawl 23 moves in the direction of approaching the outer periphery of the rachet wheel 8. As the first leg 15 of the control member 10 is located in a position between the pawl 23 and the outer periphery of the rachet wheel 8, however, the pawl 23 abuts against the first leg 15 and is supported thereby, as shown in FIG. 3, to inhibit further swing of the hook plate 19 in clockwise direction beyond this point. Accordingly, the engagement of the pawl 23 with the teeth 9 of the rachet wheel is inhibited so that the webbing can further be pulled out in this state, if necessary.

FIG. 4 is an explanatory side sectioanal view of the automatic locking retractor of this invention showing the second stage in the process of the operation. The webbing is fastened by a buckling operation after being pulled out over a necessary length. When the webbing 5 is loosened on the buckling operation, the shaft 5 is rotated in the direction of rewinding the webbing (in clockwise direction in FIG. 4) by resiliency of the spring 6 whereby the webbing pulled out in excess length is rewound. In this case, the control member 10 is also rotated in the same direction together with the shaft 5 and stopped at the stage that the projection 12 abuts against the stopper 14. By the rotation of the control member 10, the pawl 23 is detached from the supporting first leg 15 and once abuts on the outer periphery of the rachet wheel 8. As the rachet wheel 8 is rotated in the direction of rewinding the webbing (in clockwise direction in FIG. 4, or in other words, in the unlocking direction), the pawl 23 abutting on the outer periphery of the rachet wheel 8 is not engaged with the teeth 9. By the rotation of the control member 10 in the same direction, however, the pawl 23 is then supported by the second leg 16, resisting to the resiliency of the spring means 26. As the pawl 23 is detached from the outer periphery of the rachet wheel 8 in this state, the pawl 23 is not brought into contact with the teeth 9 of the rachet wheel 8 so that occurrence of an unpleasant clicking noise can be prevented during the rotation of the rachet wheel 8 in the rewinding direction. The webbing pulled out in excess length in thus rewound by the retracror so that the belt-wearer is put in a normally fastened condition.

FIG. 5 is an explanatory side sectional view of the automatic locking retractor of this invention showing the third stage in the process of the operation. In case the webbing W is pulled out under the normal belt-wearing condition as shown in FIG. 4, the shaft 5 is rotated in the direction of the webbing being pulled out (in counterclockwise direction in FIG. 5) while winding up the spring means 6, whereby the control member 10 is also rotated in the same direction. The pawl 23 is detached from the second leg 16 of the control member 10 and swung in the direction of approaching the outer periphery of the rachet wheel 8 whereby the tip of the pawl 23 is brought into contact with the outer periphery of the rachet wheel 8 and entered in the hook 17 in a toppled U-shape, as shown in FIG. 5. By means of the hook 17, therefore, the pawl 23 is held in a position ready to be engaged with one of the teeth 9 of the rachet wheel 8. Even if the rotation of the shaft 5 in the direction of the webbing being pulled out is so rapid that some time lag occurs for swing of the pawl 23 to the outer periphery of the rachet wheel 8, the pawl 23 will surely be captured by the hook 17, as shown by a chain line in FIG. 5, since the outwardly extending first leg 15 is longer than the second leg 16 and the hook 17 is specifically shaped so as to facilitate capture of the pawl 23. Thus, the hook 17 of the first leg 15 is designed to capture the tip of the pawl 23 whereby the pawl 23 is forced toward the rachet wheel 8 and guided to one of the teeth 9 formed thereon.

FIG. 6 is an explanatory side sectional view of the automatic locking retractor of this invention showing the last stage in the process of the operation. At the stage, the pawl 23 has been captured and guided to one of the teeth 9 by the action of the hook 17 of the first leg 15, the engagement of the pawl 23 with the rachet wheel 8 is completed. In this last stage, the projection 12 of the control member 10 abuts against the stopper 13 to stop the rotation of the control member 10 but the rotation of the shaft 5 and the rachet wheel 8 integrally fixed thereto are allowed to rotate in the direction of the webbing being pulled out. On the other hand, the tip of the pawl 23 is pressed against the outer periphery of the rachet wheel 8 by resiliency of the spring means 26 and the pressing force of the hook 17 and allowed to slide on the rachet wheel 8 when it is rotated. When one of the teeth 9 of the rachet wheel 8 comes to the position where the pawl 23 is pressed against the outer periphery of the rachet wheel 8, the pawl 23 is forced into the indentation between the teeth to engage with one of the teeth. The rotation of the rachet wheel 8 and the shaft 5 is thus stopped to make it impossible to pull out the webbing. As the pawl 23 is pressed downwardly by the tip of the first leg 15 to secure the engagement with the tooth, the pawl 23 is not disengaged from the tooth by swinging.

When the tensile force applied to the webbing W is eliminated and such locked condition to permit the rotation of the shaft 5 in the direction of rewinding the webbing (in clockwise direction in FIG. 6) by resiliency of the spring means 6, the rachet wheel 8 and the control member 10 are rotated in the same direction whereby the pawl 23 is disengaged from the tooth and then supported by the second leg 16, thus returning to the state as shown in FIG. 4.

Alternatively, when the seat belt is unfastened by disengagement of the buckle parts, the shaft 5 is rotated in the direction of rewinding the webbing by resiliency of the spring means 6. In this case, the control member 10 and the rachet wheel are also rotated in the same direction as in the case above described whereby the projection 12 of the control member 10 is removed until it abuts against the stopper 14 to let the second leg 14 support the pawl 23, resisting to resiliency of the spring means 26. In this case, the pawl 23 is kept free from abutting against the outer periphery of the rachet wheel 8 so that the webbing can be rewound without any problem of an unpleasant clicking noise. When rewinding of the webbing proceeds further and the diameter of a roll of the webbing rewound on the shaft 5 becomes larger, the diameter-sensing means 22 is pressed by the surface of the roll to swing the hook plate 19 in the direction of allowing the pawl 23 to depart from the rachet wheel 8. When rewinding of the webbing is completely finished, the retractor is reinstated to the state as shown in FIGS. 1 and 2.

According to the automatic locking retractor of this invention comprised of a rachet wheel 8 having teeth 9 and being integrally fixed to the shaft 5, a pawl 23 capable of engaging with te rchet wheel and a diameter-sensing means 22 capable of letting the pawl 23 to engage with the rachet wheel 8 only in the case of a roll of the webbing being smaller than a predetermined amount and featured by providing therewith a specifically designed control member 10 wherein the first leg 15 is extended outwardly longer than the second leg 16 and is bent to form a special hook 17, the engagement of the pawl 23 with the rachet wheel 8 is inhibited by the diameter-sensing means 22 at the initial stage of pulling out the webbing and by the first leg 15 a the final stage, so that the webbing may be pulled out over a necessary length for a seat occupant. After fastening the seat belt by a buckling operation, the webbing is slightly rewound to cancel the support of the pawl 23 by the first leg 15 whereby the pawl is kept in the state ready to be engaged with the rachet wheel 8. In this case, the hook 17 can capture the tip of the pawl 23 to compulsorily bring it to engagement with the rachet wheel 8 and can be hold the engaged state surely to attain the function as an automatic locking retractor.

The automatic locking mechanism of the retractor of this invention is fully actuated by the use of a specifically designed control member 10 having the first leg 15 which is extended longer than the second leg 16 and bent to form a hook 17 in a special shape (a toppled U-shape) capable of easily capturing the pawl 23 and guiding it to the teeth 9 of the rachet wheel 8. As is evident from a series of FIGS. 3–6 showing the process of the locking operation, the function of the control member 10 is remarkable and warrants an assured operation in practice use.

The automatic locking retractor of the present invention is also featured by arranging the teeth 9 on the periphery of the rachet wheel 8 at an interval almost equal to the distance between the first leg 15 and the second leg 16 of the control member 10. In this case, only one tooth for engagement with the pawl 23 exists between the first leg 15 and the second leg 16, thus resulting in such an advantage that since mechanical contact between the rachet wheel 8 and the pawl 23 on rewinding the webbing is only one time, the problem of an unpleasant clicking noise avoided. The number of the teeth 9 on the periphery of the rachet wheel 8 is usually 4–8, prferably 5–6. This number if less than half of the cases as disclosed in Japanese Laid-open Utility Model Applns. Nos. Sho. 60-55565 and 60-11858. As the seat belt is adjustable within the length corresponding to the interval between the teeth 9, the belt-wearers are somewhat relieved from the so-called body-squeezing feeling. Further, no problem arises in the automatic locking retractor of this invention in connection with the "automatic body-squeezing phenomenon" as seen in the prior art retractors. The interval between the teeth 9 may be wider than the distance between the first leg 15 and the second leg 16. If the interval is significantly wider, however, the number of the teeth will become smaller, e.g. 2 or 3. In such case, a problem may occur with respect to "safety".

The automatic locking retractors of the present invention is further featured by the shape of the teeth 9 to be engaged with the pawl 23. In a preferable embodiment of the present invention, the teeth are in the form of a "U-shaped" notch. The shape of the teeth 9 may be in the form of a sharp "V-shaped" notch as seen in the prior art retractors. In aspect of mechanical strength, it has been found that a "U-shaped" notch is preferable as the shape of tooth for preventing the rachet wheel 8 from any mechanical damage resulting from repeated use.

The automatic locking retractor of the present invention characterized by a combination of these specific conditions is excellent in the automatic locking mechanism and warrants an assured operation and elimination of the faults found in the prior art similar retractors. Thus, the automatic locking retractor of the present invention is particularly useful in the field of motor-vehicle industry.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic locking retractor for a seat belt assembly, which comprises in a housing thereof a shaft for a webbing capable of pulling out and rewinding the webbing wound ont he surface thereof and being rotatably journaled to the housing, a spring for urging the shaft to rotate in the rewinding direction by resiliency of a spring, a rachet wheel being integrally fixed to the shaft, a pawl capable of taking a locked position or an unlocked position to the rachet wheel, a diameter-sensing means capable of sensing the diameter of a roll of the webbing wound on the shaft to let the pawl take the locked position to the rachet wheel only in the case of the roll being smaller than a predetermined amount, and a control member having at both ends thereof a first leg and a second leg each extending beyond the outer periphery of the rachet wheel, the control member being fitted on the shaft in such manner that the member is slidable with friction on the shaft and rotatable coaxially with the rachet wheel within a restricted range defined by a pair of stoppers, characterized in that the rachet wheel has teeth for engagement with the pawl on the periphery thereof which are arranged at an interval almost equal to the distance between the first leg and the second leg and that the first leg positioned in rear of the second leg in the direction of pulling out the webbing extends outwardly beyond the rachet wheel longer than the second leg and the end of the first leg is bent to form a hook capable of guiding the pawl to the tooth on the rachet wheel.

2. The automatic locking retractor according to claim 1, wherein the control member is a metal wire having been bent to form in the central part thereof a projection in an upside-down U- or V-shape and at both ends thereof the first leg in a toppled U-shape so as to capture the tip of the pawl and the second leg simply in L-shape.

3. The automatic locking retractor according to claim 1, wherein the teeth on the periphery of the rachet wheel have been formed by a U-shaped notch.

* * * * *